United States Patent [19]

Kamiya et al.

[11] Patent Number: 4,742,106
[45] Date of Patent: May 3, 1988

[54] POLYOLEFIN COMPOSITIONS HAVING HIGH RIGIDITY AND HIGH IMPACT RESISTANCE

[75] Inventors: Takeshi Kamiya, Kamakura; Noboru Yamaoka, Yokohama, both of Japan

[73] Assignee: Nippon Petrochemicals Company, Limited, Tokyo, Japan

[21] Appl. No.: 9,524

[22] Filed: Feb. 2, 1987

[30] Foreign Application Priority Data

Feb. 3, 1986 [JP] Japan ................... 61-20278

[51] Int. Cl.$^4$ .............................................. C08K 3/34
[52] U.S. Cl. ................... 524/449; 524/524; 524/528
[58] Field of Search ............ 524/449, 524, 528

[56] References Cited

U.S. PATENT DOCUMENTS

| | | | |
|---|---|---|---|
| 4,229,504 | 10/1980 | Brachman | 524/451 |
| 4,412,103 | 10/1983 | Fujii et al. | 324/449 |
| 4,467,077 | 8/1984 | Meyer et al. | 524/449 |
| 4,504,617 | 3/1985 | Yui et al. | 524/449 |
| 4,604,421 | 8/1986 | Mitsuno et al. | 524/449 |
| 4,650,818 | 3/1987 | Oka et al. | 524/449 |

FOREIGN PATENT DOCUMENTS

| | | | |
|---|---|---|---|
| 0136736 | 11/1976 | Japan . | |
| 0084044 | 7/1978 | Japan | 524/449 |
| 6149452 | 11/1981 | Japan | 524/449 |
| 0108241 | 6/1983 | Japan . | |
| 0105042 | 6/1984 | Japan | 524/449 |
| 0043057 | 11/1984 | Japan . | |
| 0016982 | 4/1985 | Japan . | |
| 0202144 | 10/1985 | Japan | 524/449 |
| 1103951 | 5/1986 | Japan . | |

*Primary Examiner*—Herbert J. Lilling
*Attorney, Agent, or Firm*—Stevens, Davis, Miller & Mosher

[57] ABSTRACT

A polyolefin composition having a high rigidity and a high impact resistance, said polyolefin composition comprising:

(a) 10–96% by weight of a propylene polymer;
(b) 2–30% by weight of an ethylene/α-olefin copolymer obtained by copolymerizing ethylene with an α-olefin having 3 to 12 carbon atoms in the presence of a catalyst consisting essentially of a solid material and an organoaluminum compound, said solid material containing magnesium and titanium and/or vanadium, and said ethylene/α-olefin copolymer having the following properties (i)–(iv):

| | | |
|---|---|---|
| (i) | Melt index | 0.01–100 g/10 min |
| (ii) | Density | 0.860–0.910 g/cm$^3$ |
| (iii) | Maximum peak temperature as measured according to a differential scanning calorimetry (DSC) | not lower than 100° C. |
| (iv) | Insolubles in boiling n-hexane | not less than 10 wt. % |

(c) 20–60% by weight of a mica, provided the toal amount of said components (a), (b) and (c) is 100% by weight.

9 Claims, 1 Drawing Sheet

1 : LLDPE
2 : ETHYLENE-α-OLEFIN COPOLYMER
    (USED IN THE PRESENT INVENTION)
3 : EPR

POLYOLEFIN COMPOSITIONS HAVING HIGH RIGIDITY AND HIGH IMPACT RESISTANCE

BACKGROUND OF THE INVENTION

The present invention relates to a polyolefin composition having high rigidity and high impact resistance. More particularly, the present invention is concerned with a polyolefin composition comprising a propylene polymer, a specific ethylene/α-olefin copolymer and mica and having high rigidity and high impact resistance.

In recent years there has been a marked trend to the reduction of weight from the standpoint of resources saving and energy saving particularly in the fields of automobile industry and electric industry. For example, in the automobile industry, there is now a strong tendency to form various components, including outside plating, bumper and instrument panel, from resins. Similar tendency is occuring also in the field of household electrical appliances and of electric wire coating. Substitution for conventional materials such as steel plate and aluminum, as well as reduction in thickness of conventional resins, have been being tried actively.

From such point of view, various resins having high rigidity and high impact resistance have already been put to practical use. For example, in the field of polyolefin resins there have been developed, in an effort to attain high rigidity and high impact resistance, such compositions as blend compositions comprising various inorganic fillers and propylene block copolymer superior in impact resistance (see Japanese Patent Publication Nos. 43057/1984 and 3417/1985), compositions obtained by adding a nucleating agent to the above blend compositions (see Japanese Patent Publication No. 1741/1984), and blend compositions comprising inorganic fillers, polypropylene and ethylene-propylene rubber (see Japanese Patent Laid Open No. 136736/1976, Japanese Patent Publication No. 16982/1985 and U.S. Pat. No. 4,229,504). Usually employed as inorganic fillers are calcium carbonate, talc and glass fiber. The use of mica is also known (see Japanese Patent Laid Open No. 108241/1983).

However, it is desirable that both rigidity and impact resistance be as high as possible. And when polypropylene resins are blended with inorganic fillers for the enhancement of strength and rigidity, the resulting blends tend to be markedly reduced in impact resistance. Further, impact resistance at low temperature is also very important in practical use. When these points are taken into consideration, such known compositions of high rigidity and high impact resistance as inorganic filler/propylene block copolymer blend composition and inorganic filler/polypropylene/ethylene-propylene rubber blend composition are still insufficient in point of performance and the development of compositions further superior in rigidity and impact resistance is desired.

SUMMARY OF THE INVENTION

It is the object of the present invention to overcome the above-mentioned problem and particularly provide a novel composition having extremely high rigidity and high impact resistance and being superior in the balance between strength or rigidity and impact resistance.

Having made extensive studies along the above object, the present inventors found out that a polyolefin composition comprising a propylene polymer, a specific ethylene/α-olefin copolymer and mica exhibited extremely high rigidity and high impact resistance. And on the basis of this finding we reached the present invention.

More specifically, the present invention resides in a polyolefin composition having a high rigidity and a high impact resistance, said polyolefin composition comprising:

(a) 10-96% by weight of a propylene polymer;

(b) 2-30% by weight of an ethylene/α-olefin copolymer obtained by copolymerizing ethylene with an α-olefin having 3 to 12 carbon atoms in the presenece of a catalyst consisting essentially of a solid material and an organoaluminum compound which solid material contains magnesium and titanium and/or vanadium, said ethylene/α-olefin copolymer having the following properties (i)-(iv):

| (i) | Melt index | 0.01-100 g/10 min |
|---|---|---|
| (ii) | Density | 0.860-0.910 g/cm$^3$ |
| (iii) | Maximum peak temperature as measured according to a differential scanning calorimetry (DSC) | not lower than 100° C. |
| (iv) | Insolubles in boiling n-hexane | not less than 10 wt. % | and
(c) 2-60% by weight of a mica,
provided the total amount of the components (a), (b) and (c) is 100% by weight.

It is a well-known fact that blending polypropylene with an inorganic filler results in improvement of rigidity. In this case, however, there occurs deterioration of impact resistance and thus it is extremely difficult to obtain a composition superior in both rigidity and impact resistance. The present inventors have solved this technical problem by using the above components (a), (b) and (c). If a substance other than mica is used as component (c), there will not be attained such a superior effect as in the present invention. Further, even if a copolymer other than the specific ethylene/α-olefin copolymer defined herein is used as component (b), for example, even if there is used ethylene-propylene rubber or styrene-butadiene rubber, it will be impossible to attain the effect of the present invention. Thus, the superior effect of the present invention can be attained only when using the specific ethylene/α-olefin copolymer [component (b)] defined herein and mica [component (c)].

DETAILED DESCRIPTION OF THE INVENTION

The contents of the present invention will be described in detail hereinunder.

(1) Propylene Polymer [Component (a)]

As examples of the propylene polymer used as component (a) in the composition of the present invention there are mentioned propylene homopolymer and copolymers of propylene and α-olefins of $C_2$ to $C_8$, such as polypropylene and random or block polypropylene copolymers, prepared using Ziegler-Natta type catalysts according to known techniques. In the case of using a copolymer of propylene with an α-olefin of $C_2$ to $C_8$, the α-olefin content in the copolymer should be not more than 30 wt. %.

Examples of $C_2$-$C_8$ α-olefins include ethylene, 1-butene, 1-hexene and 1-octene.

The melt index (MI, according to JIS K 6758) of the propylene polymer is not specially limited, but usually it is in the range of 0.1 to 100 g/10 min, preferably 1 to 30 g/10 min, in consideration of moldability and impact resistance.

(2) Ethylene/α-Olefin Copolymer [Component (b)]

In the ethylene/α-olefin copolymer used as component (b) in the present invention, the α-olefin to be copolymerized with ethylene is one having $C_3$ to $C_{12}$. Examples are propylene, 1-butene, 4-methyl-1-pentene, 1-hexene, 1-octene, 1-decene and 1-dodecene. Particularly preferred are those having $C_3$–$C_6$ such as propylene, 1-butene, 1-methyl-1-pentene and 1-hexene. Further, dienes such as butadiene, 1,4-hexadiene, 1,5-hexadiene, vinyl norbornene, ethylydene norbornene and dicyclopentadiene may be used as comonomers. It is preferable that the α-olefin content in the ethylene/α-olefin copolymer be in the range of 5 to 40 mol %.

The following description is provided about how to prepare the ethylene/α-olefin copolymer [component (b)] used in the present invention.

The catalyst system used comprises a solid catalyst component and an organoaluminum compound, the solid catalyst component containing at least magnesium and titanium and/or vanadium. The solid catalyst component is obtained, for example, by supporting a titanium compound and/or vanadium on an inorganic solid compound containing magnesium by a known method. Examples of magnesium-containing inorganic solid compounds include, in addition to metal magnesium, magnesium hydroxide, magnesium oxide, magnesium carbonate, magnesium chloride, as well as double salts, double oxides, carbonates, chlorides and hydroxides, which contain magnesium atom and a metal or semimetal selected from silicon, aluminum and calcium, further, these inorganic solid compounds after treatment or reaction with oxygen-containing compounds, sulfur-containing compounds, aromatic hydrocarbons or halogen-containing substances.

As examples of the above oxygen-containing compounds are mentioned water, organic oxygen-containing compounds such as alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounds such as thiols, thio-ethers, and the like, inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrate the titanium compound to be supported on the inorganic solid compound containing magnesium, mention may be made of halides, alkoxyhalides, alkoxides and halogenated oxides, of titanium. Tetravalent and trivalent titanium compounds are preferred. As tetravalent titanium compounds are preferred those represented by the general formula $Ti(OR)_nX_{4-n}$ wherein R is an alkyl, aryl or aralkyl group having 1 to 20 carbon atoms, X is a halogen atom and n is $0 \leq n \leq 4$, such as, for example, titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As examples of trivalent titanium compounds are mentioned titanium trihalides obtained by reducing titanium tetrahalides such as titanium tetrachloride and titanium tetrabromide with hydrogen, aluminum, titanium or an organometallic compound of a Group I–III metal in the Periodic Table, as well as trivalent titanium compounds obtained by reducing tetravalent alkoxytitanium halides of the general formula $Ti(OR)_mX_{4-m}$ with an organometallic compound of a Group I–III metal in the Periodic Table in which formula R is an alkyl, aryl or aralkyl group having 1 to 20 carbon atoms, X is a halogen atom and m is $0 < m < 4$. Tetravelent titanium compounds are particularly preferred.

To illustrate the vanadium compound, mention may be made of tetravalent vanadium compounds such as vanadium tetrachloride, vanadium tetrabromide and vanadium tetraiodide, pentavalent vanadium compounds such as vanadium oxytrichloride and alkyl orthovanadate, and trivalent vanadium compounds such as vanadium trichloride and vanadium triethoxide.

As other examples of catalyst systems are mentioned combinations of organoaluminum compounds with reaction products as solid catalyst components obtained by the reaction of organomagnesium compounds such as so-called Grignard compounds with titanium and/or vanadium compounds. Examples of organomagnesium compounds are those of the general formulae RMgX, $R_2Mg$ and RMg(OR) wherein R is an organic radical having 1 to 20 carbon atoms and X is a halogen atom, and ether complexes thereof, as well as modified compounds obtained by modifying these organomagnesium compounds with other organometallic compounds such as, for example, organosodium, organolithium, organopotassium, organoboron, organocalcium and organozinc.

As still other examples of catalyst systems are mentioned combinations of organoaluminum compounds with solid products obtained by contacting such inorganic oxides as $SiO_2$ and $Al_2O_3$ with the solid catalyst component containing at least magnesium and titanium and/or vanadium. In addition to $SiO_2$ and $Al_2O_3$ there also may be mentioned CaO, $B_2O_3$ and $SnO_2$ as examples of inorganic oxides. Double oxides thereof are also employable without any trouble. For contacting these inorganic oxides with the solid catalyst component containing magnesium and titanium and/or vanadium, there may be adopted a known method. For example, both may be reacted at a temperature of 20° to 400° C., preferably 50° to 300° C., usually for 5 minutes to 20 hours, in the presence or absence of an inert solvent, or both may be subjected to a copulverization treatment, or there may be adopted a suitable combination of these methods.

In these catalyst systems the titanium and/or vanadium compounds may be used as adducts with organocarboxylic acid esters, and the magnesium-containing inorganic solid compounds may be used after contact treatment with organocarboxylic acid esters. Moreover, the organoaluminum compounds may be used as adducts with organocarboxylic acid esters. Further, in all cases the catalyst systems may be prepared in the presence of organocarboxylic acid esters without any trouble.

As organocarboxylic acid esters there may be used various aliphatic, alicyclic and aromatic carboxylic acid esters, preferably aromatic carboxylic acid esters having 7 to 12 carbon atoms. Examples are alkyl esters such as methyl and ethyl esters of benzoic, anisic and toluic acids.

As preferred examples of the organoaluminum compound to be combined with the solid catalyst component are mentioned those represented by the general formulae $R_3Al$, $R_2AlX$, $RAlX_2$, $R_2AlOR$, $RAl(OR)X$ and $R_3Al_2X_3$ wherein Rs, which may the same or different, are each an alkyl, aryl or aralkyl group having 1 to 20 carbon atoms, such as triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, but usually it is in the range of 0.1 to 1,000 mols per mol of the titanium compound.

The catalyst system exemplified above may be contacted with an α-olefin before its use in the polymerization reaction. By so doing, its polymerization activity can be greatly improved and a more stable operation is ensured as compared with the case where it is not so treated. In this case, various α-olefins are employable, but preferably those having 3 to 12 carbon atoms and more preferably those having 3 to 8 carbon atoms. Examples are propylene, 1-butene, 1-pentene, 4-methyl-1-pentene, 1-hexene, 1-octene, 1-decene, 1-dodecene, and mixtures thereof. The temperature and the time of the contact between the catalyst system and α-olefin can be selected over a wide range, for example, 0°–200° C., preferably 0°–110° C., and 1 minute to 24 hours. The amount of the α-olefin to be contacted with the catalyst system can also be selected over a wide range, but usually it is desirable that the catalyst system be treated with 1 g to 50,000 g, preferably 5 g to 30,000 g of the α-olefin per gram of the solid catalyst component and reacted with 1 g to 500 g of the α-olefin per gram of the solid catalyst component. The pressure in the contact treatment is not specially limited, but preferably it is in the range of $-1$ to 100 kg/cm²·G.

In the α-olefin treatment, the catalyst system may be contacted with the α-olefin after combining the total amount of the organoaluminum compound used with the solid catalyst component, or the catalyst system may be contacted with the α-olefin after combining a part of the organoaluminum compound used with the solid catalyst component and the remaining portion of the organoaluminum compound may be added separately in the polymerization reaction. The contact treatment of the catalyst system with the α-olefin may be conducted in the presence of hydrogen gas or any other inert gas, e.g. nitrogen, argon or helium.

The copolymerization reaction is carried out in the same manner as in the conventional olefin polymerization reaction using a Ziegler type catalyst. More particularly, the reaction is performed in a substantially oxygen- and water-free condition in vapor phase or in the presence of an inert solvent or using monomer per se as solvent. Copolymers obtained by a vapor phase polymerization are most preferable. Olefin polymerizing conditions involve temperatures in the range of 20° to 300° C., preferably 40° to 200° C., and pressures in the range from normal pressure to 70 kg/cm²·G, preferably 2 to 60 kg/cm²·G. The molecular weight can be adjusted to some extent by changing polymerization conditions such as polymerization temperature and catalyst mol ratio, but the addition of hydrogen into the polymerization system is more effective for this purpose. Of course, two or more multi-stage polymerization reactions involving different polymerization conditions such as different hydrogen concentrations and different polymerization temperatures can be carried out without any trouble.

The MI (according to JIS K 6760) of the ethylene/α-olefin copolymer thus prepared is in the range of 0.01 to 100 g/10 min, preferably 0.1 to 50 g/10 min. Its density (according to JIS K 6760) is in the range of 0.860 to 0.910 g/cm³, preferably 0.870 to 0.905 g/cm³. Its maximum peak temperature (Tm) measured according to a differential scanning calorimetry (DSC) is not lower than 100° C., preferably not lower than 110° C. Its insolubles in boiling n-hexane are not less than 10 wt. %, preferably 20–95 wt. %.

If the MI of the ethylene/α-olefin copolymer is less than 0.01 g/10 min, the MI of the polyolefin composition will be too much reduced and its fluidity will be deteriorated, and if it exceeds 100 g/10 min, the tensile strength will be reduced. Thus both such values are undesirable. A density thereof lower than 0.860 g/cm³ would cause a lowering in tensile strength, create a surface stickiness of the resin composition and impair the appearance, and a density thereof exceeding 0.910 g/cm³ would cause reductions of flexibility and transparency. Thus both such density values are undesirable. A Tm thereof lower than 100° C. would cause a lowering of tensile strength and of heat resistance and oil resistance and create a surface stickiness of the resin composition and is thus undesirable. If the content of insolubles in boiling n-hexane is less than 10 wt. %, the resultant composition will be reduced in tensile strength and become sticky on its surface and thus such a content is not desirable.

The measurement of Tm by DSC and how to determine insolubles in boiling n-hexane are measured in the following manner.

[Measurement of Tm by DSC]

About 5 mg of a specimen was accurately weighed from a hot-pressed 100 μm thick film and then set on a differential scanning calorimeter. The temperature was raised to 170° C. and the specimen was held at this temperature for 15 minutes, thereafter cooled to 0° C. at a rate of 2.5° C./min. Then, measurement wss done with raising the temperature from this state to 170° C. at a rate of 10° C./min. The temperature at the vertex position of the maximum peak of peaks which appeared during the heat-up period from 0° to 170° C. was regarded as Tm.

[How to Determine Insolubles in Boiling n-Hexane]

A 200 μm thick sheet was formed using a hot press, from which were then cut out three sheets each 20 mm long by 30 mm wide. Using these sheets, extraction was made in boiling n-hexane for 5 hours by means of a double-tube type Soxhlet extractor. n-Hexane insolubles were taken out and vacuum-dried (7 hours, 50° C.), then the content of insolubles in boiling n-hexane was calculated in accordance with the following equation:

Insolubles in boiling n-hexane =

$$\frac{\text{Weight of Sheet after Extraction}}{\text{Weight of Sheet before Extraction}} \times 100 (\text{wt. \%})$$

The ethylene/α-olefin copolymer used as component (b) in the present invention includes both a highly crystalline portion and an amorphous portion, and it is a special ethylene copolymer having both the mechanical strength and heat resistance of conventional crystalline polyolefin resins and the rubbery elasticity and flexibility of conventional amorphous polymers. As conventional commercially available ethylene/α-olefin copolymers of this sort there are known a linear low-density polyethylene (LLDPE) and ethylene-propylene copolymer rubber (EPR).

However, the ethylene/α-olefin copolymer used in the present invention is clearly distinguished from those conventional LLDPE and EPR.

Figure 1:
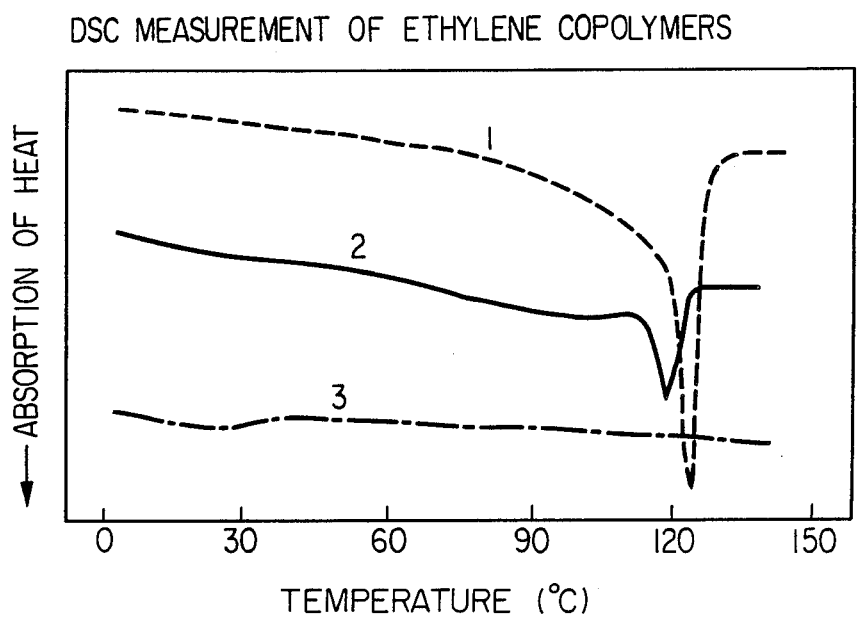
FIG. 1 shows crystal melt behaviors of a typical LLDPE, the ethylene/α-olefin copolymer used in the present invention and EPR as determined according to DSC.

As is seen from the results shown therein, the LLDPE has a considerable degree of crystallinity and is superior in heat resistance and mechanical strength, but is poor in flexibility and less receptive of inorganic fillers such as mica.

On the other hand, the commercially available EPR is produced using a solid catalyst containing vanadium as a main component and it has little crystallinity. Even if a crystalline portion is present, its proportion is extremely small and the Tm according to DSC is far lower than 100° C. Such EPR does not have the above-mentioned drawbacks of the LLDPE, that is, poor flexibility and insufficient receptivity of inorganic fillers, but it involves the problem that its heat resistance and mechanical strength are reduced.

(3) Mica [Component (c)]

As to mica used as component (c) in the present invention, no special limitation is placed on its properties such as particle size, shape and presence of trace ingredients. But a mica having a particle size in the range of 5 to 250 μm and an aspect ratio in the range of 5 to 120 is preferred. As to the particle size, a value in the range of 5 to 150 μm is particularly preferred from the standpoint of mechanical strength of the resulting composition. The mica may be treated with a known coupling agent before its use.

(4) Preparation of Resin Composition

The blending ratio of components (a), (b) and (c) is 10–96 wt. %:2–30 wt %:2–60 wt. %, preferably 30–96 wt. %:2–30 wt. %:2–40 wt. %, more preferably 50–90 wt. %:5–20 wt. %:5–30 wt. %, in terms of (a):(b):(c), provided the total amount of the three components is 100 wt. %.

If the amount of component (a) exceeds 96 wt. %, the impact resistance of the resulting polyolefin composition will be reduced, and an amount thereof smaller than 10 wt. % will result in deterioration of rigidity.

If the amount of component (b) exceeds 30 wt. %, rigidity will be reduced, and if it is smaller than 2 wt. %, deterioration of impact resistance will result.

If the amount of component (c) exceeds 40 wt. %, the resulting composition will become harder and more brittle, and if it is smaller than 2 wt. %, rigidity and tensile strength will be reduced.

Thus the composition of the present invention is obtained by blending the components (a), (b) and (c) in predetermined proportions. For special purposes, however, an appropriate amount of an additional component may be incorporated therein for modification. Examples of such additional component include polyolefins such as high pressure polyethylenes, high density polyethylenes, low pressure medium and low density polyethylenes, polybutene, poly-4-methyl-1-pentene, ethylene-vinyl acetate copolymer, ethylene-ethyl acrylate copolymer, and ethylene-propylene rubber; reaction products of these polyolefins as well as components (a) and (b) with unsaturated carboxylic acids or derivatives thereof such as acrylic, methacrylic, fumaric and maleic acids and maleic anhydride; known resins such as polystyrene and petroleum resins; and other rubber components.

Particularly preferred is the reaction product of the above-exemplified various polyolefins, including the components (a) and (b) with an unsaturated carboxylic acid or a derivative thereof. In this case, the amount of such reaction product is in the range of 0 to 20, preferably 0 to 10 and more preferably 0.5 to 5, parts by weight based on the total amount of 100 parts by weight of the components (a), (b) and (c). The polyolefin thus modified with unsaturated carboxylic acid or derivative thereof is effective in promoting uniform dispersion of mica and improving specially mechanical strength.

Examples of the said unsaturated carboxylic acid or derivative thereof include acrylic, methacrylic, maleic, fumaric, crotonic, itaconic and citraconic acids, as well as metallic salts, amides, imides, esters and anhydrides of those acids, with maleic anhydride being particularly preferred. The amount of the unsaturated carboxylic acid or derivative thereof is in the range of 0.05 to 5.0, preferably 0.1 to 3.0, parts by weight based on 100 parts by weight of polyolefin reacted therewith. Its reaction with polyolefin is carried out usually by heating in the presence of an organic peroxide.

Further, the impact resistance can be improved remarkably by using a small amount of a nucleating agent. As the nucleating agent there may be used a known one, examples of which include inorganic fine powders such as silica, aliphatic and aromatic dicarboxylic acids, aromatic carboxylic acids and anhydrides or metallic salts of those carboxylic acids. Sorbitols and phosphates are also mentioned as examples. For propylene polymers, sodium and aluminum salts of benzoic acid are preferred. The amount of the nucleating agent is preferably in the range of 0.01 to 1.0 part by weight based on the total amount of 100 parts by weight of the components (a), (b) and (c).

Other fillers such as glass fiber, carbon fiber, calcium carbonate and talc may be used for reinforcement.

Kneading of the polyolefin composition can be done by a known method using rolls, Bambury mixer, Gelimat mixer, kneader, extruder or twin-screw extruder. In order to obtain the composition superior in physical properties, it is important to mix the components as homogeneously as possible.

As described above, the composition of the present invention is a blend of a polypropylene polymer with a specific ethylene/α-olefin copolymer and a mica. It was found to be remarkably improved in all of rigidity, strength and impact resistance and exhibit a superior performance not found in conventional materials.

The composition of the present invention having such excellent properties is expected to not only be in great demand as a substitute for metallic materials in automobile and electric industries, but also be utilized widely in such applications as household articles, building materials, modifier for various polymers, and other new applications.

The present invention will be described below concretely on the basis of working examples thereof and comparative examples. But it is to be understood that the invention is not limited thereto.

Values of physical properties of the following compositions were measured according to the following methods:

| | |
|---|---|
| Izod impact resistance | ASTM D-256 |
| Flexural modulus | ASTM D-790 |
| Tensile strength | ASTM D-638 |

EXAMPLES 1-8

The following components (a), (b) and (c) were used.

Component (a)

A Propylene homopolymer (MI 8.0 g/10 min).

B Propylene-Ethylene block copolymer (Ethylene content 8 wt. %, MI 4.0 g/10 min).

Component (b)

C Ethylene-Propylene copolymer 1,000 g of anhydrous magnesium chloride, 50 g of 1,2-dichloroethane and 170 g of titanium tetrachloride were ball-milled for 16 hours at room temperature in a nitrogen atmosphere and there was obtained the titanium compound supported on the carrier. The resulting solid material was found to contain 35 mg of titanium per gram thereof.

A stainless steel autoclave was used as an apparatus for vapor phase polymerization, and a loop was constructed of a blower, a flow control valve and a dry cyclone for separating the resulting polymer. The temperature of the autoclave was controlled by passing warm water through a jacket.

The polymerization temperature was set at 80° C. The solid material prepared above and triethylaluminum were fed into the autoclave at rates of 250 mg/hr and 50 mmol/hr, respectively. The polymerization was allowed to proceed while adjusting the proportions (molar ratios) of ethylene, propylene and hydrogen in the gases fed by means of the blower into the autoclave at 54%, 35% and 11%, respectively.

The copolymer thus obtained was found to have a propylene content of 16 mol %, an MI of 1.5 g/10 min, a density of 0.895 g/cm$^3$, a Tm according to DSC of 121° C., and insolubles in boiling n-hexane of 69 wt. %.

D Ethylene - 1-Butene copolymer (1)

Ethylene and 1-butene were copolymerized in the same way as in the preparation of the above ethylene-propylene copolymer C. The copolymer thus obtained was found to have a 1-butene content of 12 mol %, an MI of 1.0 g/10 min, a density of 0.895 g/cm$^3$, a Tm according to DSC of 119° C., and insolubles in boiling n-hexane of 72 wt. %.

E Ethylene - 1-Butene copolymer (2)

Using a catalyst comprising a solid catalyst component and triethylaluminum, the solid catalyst component having been obtained from substantially anhydrous magnesium chloride, anthracene and titanium tetrachloride, there was performed a polymerization of ethylene and 1-butene in the same way as in the above C. The copolymer thus obtained was found to have a 1-butene content of 9 mol %, an MI of 1.0 g/10 min, a density of 0.903 g/cm$^3$, a Tm according to DSC of 121° C., and boiling n-hexane insolubles of 84 wt. %.

Component (C)

H Mica (Average particle diameter: about 120 μm).

The above three components (a), (b) and (c) were blended dry in the proportions shown in Table 1 and then kneaded using a twin-screw extruder. The compositions thereby obtained were measured for physical properties, results of which are set out in Table 1.

EXAMPLES 9 and 10

Compositions were prepared in just the same manner as in Example 4 except that the following components were used as maleic anhydride-modified polyolefins in addition to the components (a), (b) and (c).

K Ethylene-Propylene copolymer C modified with maleic anhydride (Maleic anhydride content 0.2 wt. %).

L Linear low-density polyethylene modified with maleic anhydride

Ethylene - 1-butene copolymer having a density of 0.922 g/cm$^2$ and an MI of 2.0 g/10 min was reacted with 0.2 wt. % of maleic anhydride and there was obtained a modified product.

Physical properties of the compositions were measured. Results are as set out in Table 1.

EXAMPLE 11

A composition was prepared in just the same manner as in Example 3 except that the following nucleating agent was used in addition to the components (a), (b) ard (c).

Nucleating Agent

M Aluminum p-tert-butyl benzoate (300 mesh, trade name: Al-PTBBA, a product of Shell Chemical Co., Ltd.).

Physical properties of the composition were measured. Results are as shown in Table 1.

COMPARATIVE EXAMPLE 1

Using propylene homopolymer A and mica H used in the above Examples as components (a) and (c), a composition was prepared by kneading in the same manner as in the above Examples except that component (b) was not used. Physical properties of the composition were measured. Results are as shown in Table 1.

COMPARATIVE EXAMPLES 2 and 3

Compositions were prepared in just the same manner as in Example 3 except that in place of the ethylene-propylene copolymer C as component (b) there were used the following which were outside the scope of the present invention.

F Linear low-density polyethylene (MI 1.0 g/10 min, Density 0.922 g/cm$^3$, trade name: LINIREX AF 2320, a product of Nippon Petrochemicals Co., Ltd.).

G Ethylene - Propylene - Non-conjugated Diene rubber (Trade name: Royalene IM 7100, a product of Uniroyal, Inc.).

Physical properties of the compositions were measured. Results are as shown in Table 1.

COMPARATIVE EXAMPLES 4 and 5

Compositions were prepared in just the same manner as in Example 3 except that in place of the mica H as component (c) there were used the following which were outside the scope of the present invention. Component (c):

I Talc (Average particle diameter: about 8 μm, a product of Hayashi Kasei K.K.).

J Calcium carbonate (Average particle diameter: about 1 μm, trade name: KS 2100, a product of Hayashi Kasei K.K.).

Physical properties of the compositions were measured. Results are as shown in Table 1.

COMPARATIVE EXAMPLE 6

Composition was prepared in the same manner as in Comparative Example 3 except that above mentioned talc I was used as component (c).

Physical properties of the composition were measured. Results are as shown in Table 1.

the scope of the present invention are inferior in that balance.

What is claimed is:

1. A polyolefin composition having a high rigidity and a high impact resistance, said polyolefin composition comprising:
   (a) 10-96% by weight of a propylene polymer;
   (b) 2-30% by weight of an ethylene/α-olefin copolymer obtained by copolymerization ethylene with an α-olefin having 3 to 12 carbon atoms in the presence of a catalyst consisting essentially of a solid material and an organoaluminum compound, said solid material containing magnesium and titanium and/or vanadium, and said ethylene/α-olefin copolymer having an α-olefin content of 5 to 40 mol % and the following properties (i)-(iv):

| | | |
|---|---|---|
| (i) | Melt index | 0.01 100 g/10 min |
| (ii) | density | 0.860 0.910 g/cm$^3$ |
| (iii) | Maximum peak temperature as measured according to a differential scanning calomimetry (DSC) | not lower than 100° C. |
| (iv) | Insolubles in boiling n-hexane | not less than 10 wt. % |

(c) 2-60% by weight of a mica,
provided the total amount of said components (a), (b) and (c) is 100% by weight.

2. A composition as set forth in claim 1, wherein the proportions of said components (a), (b) and (c) are 30-96 wt. %, 2-30 wt. % and 2-40 wt. %, respectively.

3. A composition as set forth in claim 2, wherein the proportions of said components (a), (b) and (c) are 50-90 wt. %, 5-20 wt. % and 5-30 wt. %, respectively.

4. A composition as set froth in claim 1, further including 0-20 parts by weight of the reaction product of a polyolefin and an unsaturated carboxylic acid or a derivative thereof, based on the total amount of 100 parts by weight of said components (a), (b) and (c).

5. A composition as set forth in claim 4, wherein said unsaturated carboxylic acid or derivative thereof is maleic anhydride and is used in an amount of 0.05 to 5.0

TABLE 1

| | Composition | | | | | | | | Physical Properties | | |
|---|---|---|---|---|---|---|---|---|---|---|---|
| | Component (a) | | Component (b) | | Component (c) | | other components | | Izod Impact Resistance (J/m) | Flexural Modulus (G Pa) | Tensile Strength (M Pa) |
| | Kind | Amount (wt. %) | Kind | Amount (wt. %) | Kind | Amount (wt. %) | Kind | Amount (parts by wt.*) | | | |
| Ex. 1 | A | 75 | C | 5 | H | 20 | — | 0 | 61.1 | 5.63 | 29.3 |
| Ex. 2 | A | 70 | C | 20 | H | 10 | — | 0 | 87.2 | 4.50 | 23.3 |
| Ex. 3 | A | 65 | C | 10 | H | 25 | — | 0 | 71.6 | 4.73 | 25.6 |
| Ex. 4 | A | 50 | C | 20 | H | 30 | — | 0 | 73.3 | 4.98 | 27.8 |
| Ex. 5 | A | 45 | C | 20 | H | 35 | — | 0 | 62.0 | 5.25 | 25.2 |
| Ex. 6 | B | 65 | C | 10 | H | 25 | — | 0 | 150.1 | 4.15 | 21.8 |
| Ex. 7 | A | 65 | D | 10 | H | 25 | — | 0 | 124.0 | 4.81 | 26.4 |
| Ex. 8 | A | 65 | E | 10 | H | 25 | — | 0 | 112.9 | 5.05 | 27.0 |
| Ex. 9 | A | 50 | C | 20 | H | 30 | K | 3 | 76.0 | 5.30 | 30.0 |
| Ex. 10 | A | 50 | C | 20 | H | 30 | L | 6 | 72.1 | 5.46 | 33.0 |
| Ex. 11 | A | 65 | C | 10 | H | 25 | M | 0.2 | 70.9 | 4.91 | 27.2 |
| Comp. Ex. 1 | A | 75 | — | 0 | H | 25 | — | 0 | 28.5 | 5.97 | 34.6 |
| Comp. Ex. 2 | A | 65 | F | 10 | H | 25 | — | 0 | 49.0 | 5.10 | 25.8 |
| Comp. Ex. 3 | A | 65 | G | 10 | H | 25 | — | 0 | 66.9 | 4.45 | 23.1 |
| Comp. Ex. 4 | A | 65 | C | 10 | I | 25 | — | 0 | 58.2 | 3.25 | 22.2 |
| Comp. Ex. 5 | A | 65 | C | 10 | J | 25 | — | 0 | 48.5 | 2.20 | 20.0 |
| Comp. Ex. 6 | A | 65 | G | 10 | I | 25 | — | 0 | 77.0 | 2.70 | 15.5 |

*Based on the total amount of 100 parts by weight of components (a), (b) and (c).

From Table 1 it is seen that the polyolefin compositions of Examples 1 to 11 with components (a), (b) and (c) falling under the scope of the present invention are all superior in the balance of impact resistance and flexural modulus or tensile strength and that the compositions of Comparative Examples 1 to 6 not falling under parts by weight based on 100 parts by weight of the polyolefin.

6. A composition as set forth in claim 1, further including 0.01 to 1.0 part by weight of a nucleating agent based on the total amount of 100 parts by weight of said components (a), (b) and (c).

7. A composition as set forth in claim 1, wherein said component (b) is a copolymer of ethylene and an α-olefin having 3 to 6 carbon atoms.

8. A composition as set forth in claim 1, wherein said component (b) is prepared according to a vapor phase polymerization.

9. A composition as set forth in claim 1, wherein said component (c) is a mica having a particle diameter in the range of 5 to 250 μm.

* * * * *